March 16, 1926.　　　　　　　　　　　　　　1,576,862
F. W. SNOW
RUNNER CUTTER
Filed Jan. 8, 1923　　　　2 Sheets-Sheet 1
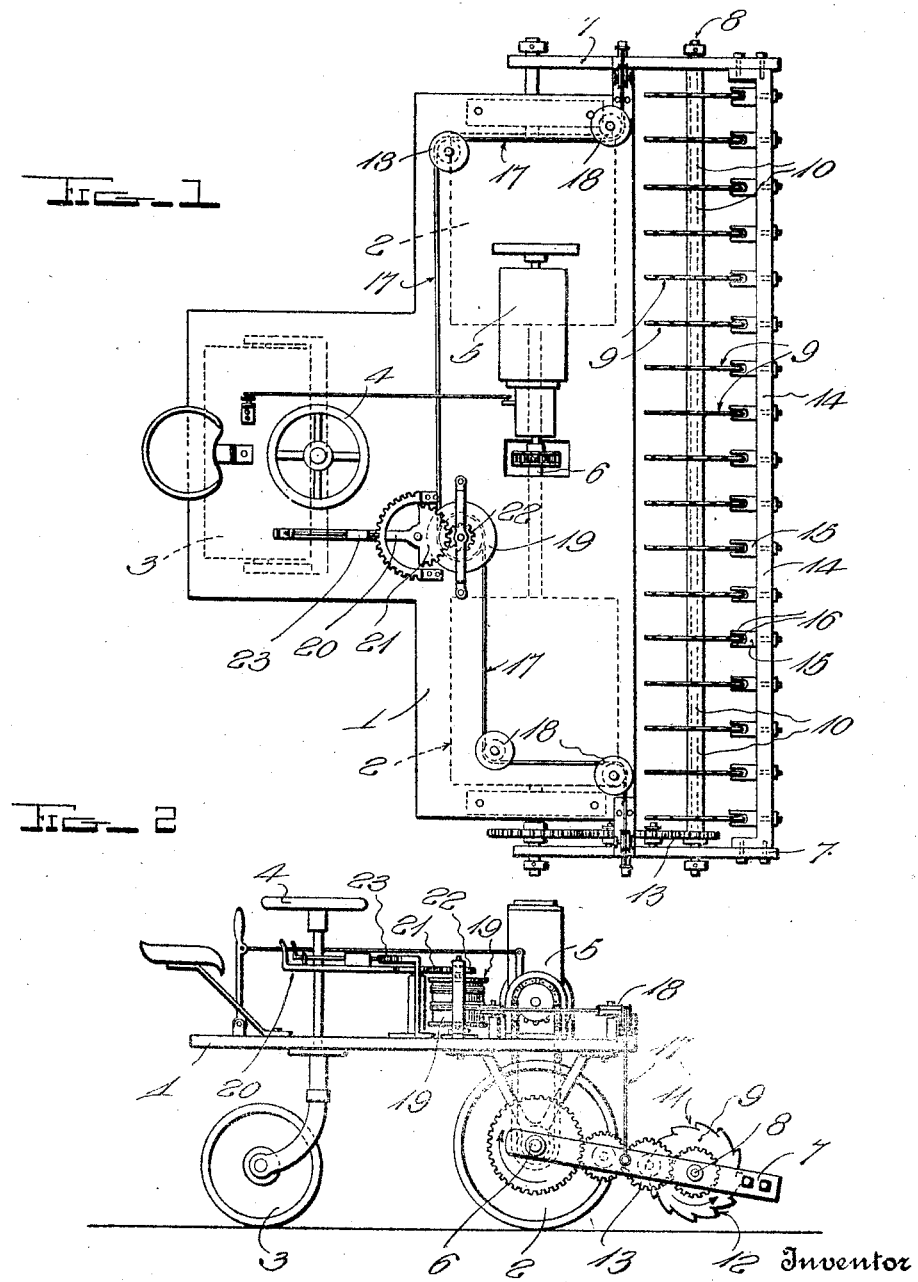
Inventor
F. W. Snow

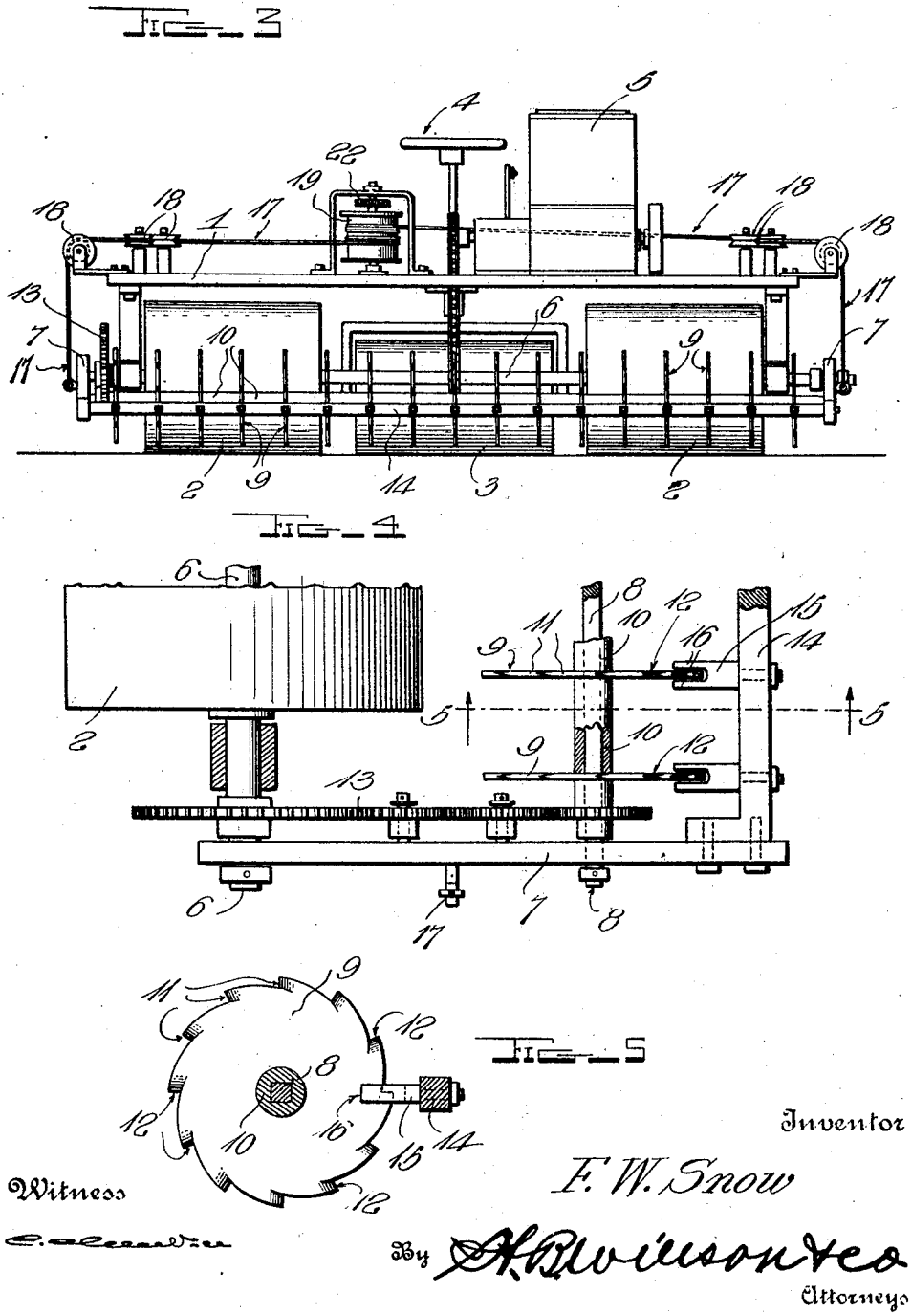

Patented Mar. 16, 1926.

1,576,862

UNITED STATES PATENT OFFICE.

FRED W. SNOW, OF BRYANTVILLE, MASSACHUSETTS.

RUNNER CUTTER.

Application filed January 8, 1923. Serial No. 611,367.

*To all whom it may concern:*

Be it known that I, FRED W. SNOW, a citizen of the United States, residing at Bryantville, in the county of Plymouth and State of Massachusetts, have invented certain new and useful Improvements in Runner Cutters; and I do declare the following to be a full, clear, and exact description of the invention, such as will enable others skilled in the art to which it appertains to make and use the same.

My invention has for its object to provide a simple, yet a highly efficient and desirable machine for cutting the runners of cranberry vines and the like without molesting the upright portions of the vines.

With the foregoing in view, the invention resides in the novel subject matter hereinafter described and claimed, the description being supplemented by the accompanying drawings.

Figure 1 is a top plan view showing a machine constructed in accordance with my invention.

Figure 2 is a side elevation.

Figure 3 is a front end elevation.

Figure 4 is an enlarged plan view partly in horizontal section.

Figure 5 is a vertical longitudinal section as indicated by line 5—5 of Fig. 4.

In the machine selected for illustrating my invention, the numeral 1 designates a suitable platform which is preferably supported upon a pair of axially alined front rollers 2 and a rear roller 3 which may be turned by a suitable steering wheel 4, for the purpose of guiding the machine. If desired, all of the rollers may be covered with rubber or some other cushioning material to prevent injury to the vines over which they must travel. Even without this protection however, there is little likelihood of seriously injuring any of the vines as the latter will again erect themselves before they bear the next crop of berries. While the machine may be propelled in any desired manner, I prefer to mount a gasoline engine 5 on the platform 1 and to connect it with the shaft 6 of the rollers 2, by a sprocket chain or other suitable clutch controlled driving connection.

In the construction shown, a pair of vertically movable side arms 7 are pivoted upon and extend forwardly from the ends of the shaft 6, the front ends of said arms carrying a rotatable shaft 8 upon which a plurality of closely spaced disks 9 are secured, said disks being spaced apart by sleeves or the like 10. Each disk is provided with a plurality of circumferentially spaced substantially V-shaped notches 11, each having one edge wall 12 sharpened and disposed on a substantially radial line, these cutting edges being intended to cut the runners of the vines by a forward and upward pull thereon, for which purpose the disks 9 are driven reversely from the rollers 2. While this driving may well be effected by any desired means, I prefer to employ a train of gearing 13 carried in part by one of the arms 7 and including gears on the two shafts 6 and 8.

The front ends of the arms 7 are connected by a transverse bar 14 which carries a plurality of bifurcated blocks 15, the furcations 16 of said blocks forming abutments disposed at opposite sides of the disks 9, against which the vine runners are moved by the cutting edges 12 to co-operate with said edges in performing the cutting operation and to prevent the vines from twisting about the disks and their carrying shaft.

For the purpose of raising and lowering the arms 7 and the disks 9 according to the height of the runners in one bog or another, I have shown a pair of cables 17 connected with said arms, suitable sheaves 18 on the platform around which said cables are trained, a drum 19 on the platform for winding or unwinding said cables, and means for operating this drum. This drum operating means preferably consists of a suitably mounted lever 20 having a gear segment 21 at its front end meshing with a pinion 22 on the drum shaft, a suitable pawl and rack 23 being employed for holding the lever in adjusted position.

By employing a machine constructed in accordance with the present invention, the mat of lateral runners may be quickly and easily cut from cranberry vines and the like at a great saving in time and expense over the usual hand method. In actual practice, the disks 9 have been found to separate the vertical portions of the vines without injuring them to any extent whatever, but the teeth of said disks engage the lateral runners and pull forwardly and upwardly thereon to sever the same. The more delicate runners are of course severed before they come in contact with the abutments 16, but the latter co-act with the disks in cutting the heavier runners and also prevent any of the vines from wrapping around the disks and the shaft which carries them. Obviously, the machine may be made to be propelled by hand, by horse-power, or by motive power, as may be desired, and within the scope of the invention as claimed, numerous minor changes may be made.

I claim:

A runner cutter comprising, a platform, rotary elements supporting the platform, axles extending beyond the ends of the elements and platform, a pair of side members pivoted at their rear ends to said extended portions of the axles and projecting forwardly beyond the platform, a horizontal bar interconnecting the forward ends of said side members, a horizontally disposed rotary shaft having its ends journaled in intermediate portions of the side members, drive connection between one projecting end of the axle and said shaft to rotate the latter in a direction opposite that of said axle, toothed cutters fixed at spaced points on the shaft, and blocks fixed to the rear face of the horizontal bar, said blocks having vertical bifurcations at their rear ends to form abutments extending on opposite sides of and in close proximity to the peripheral portions of the cutters, whereby with forward movement of the runner cutter, the toothed cutters will forwardly lift the runners to the abutments and co-act with the latter to cut the runners.

In testimony whereof I have hereunto affixed my signature.

FRED W. SNOW.